Patented Sept. 4, 1934

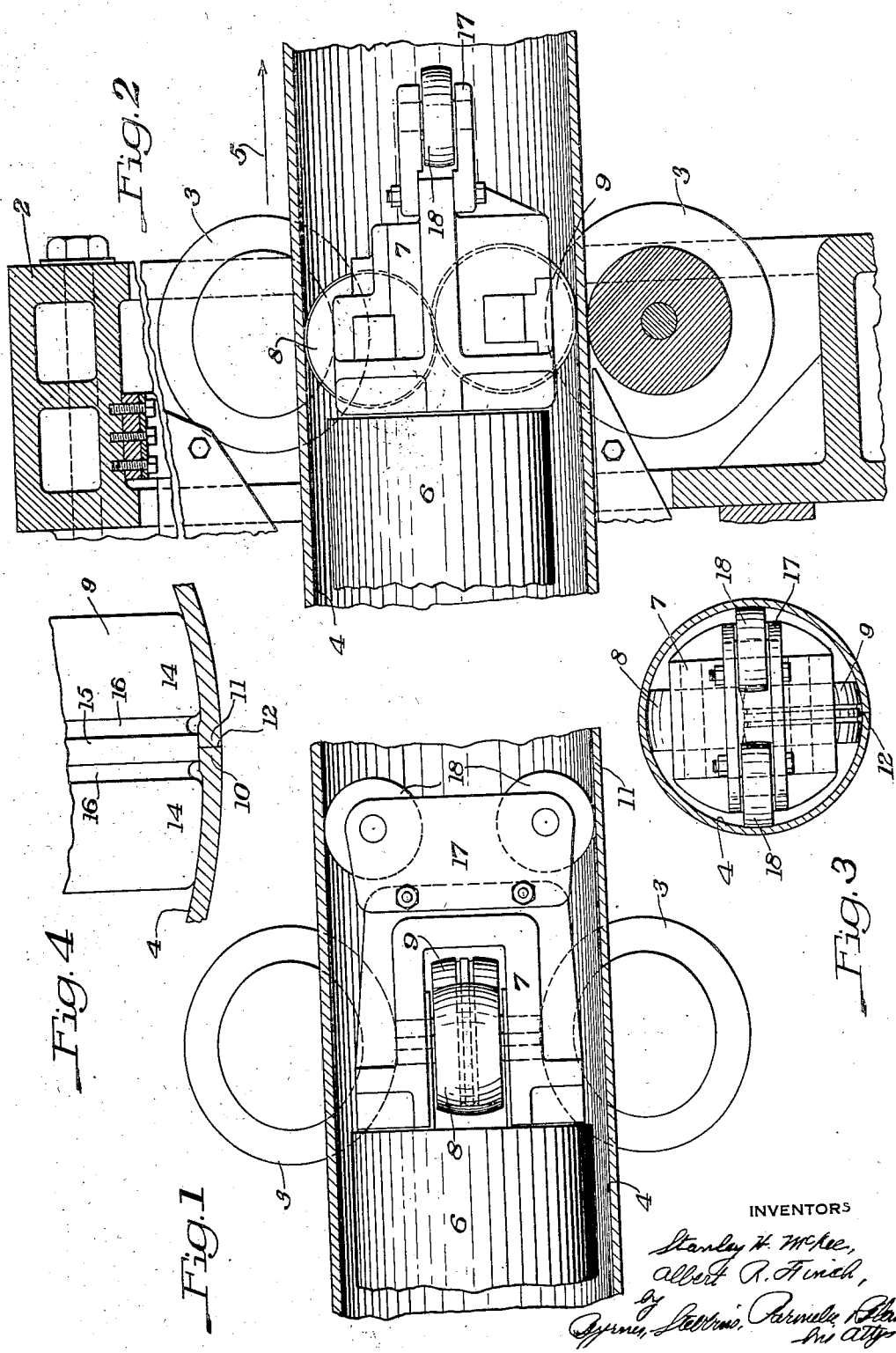

1,972,629

UNITED STATES PATENT OFFICE 1,972,629

METHOD AND APPARATUS FOR ELECTRIC WELDING

Stanley H. McKee and Albert R. Finch, Youngstown, Ohio, assignors to The Youngstown Sheet and Tube Company, Youngstown, Ohio, a corporation of Ohio Application June 11, 1931, Serial No. 543,506

4 Claims. (Cl. 219—10)

The present invention relates broadly to the art of electric welding, and more particularly to an improvement in welding apparatus of the character utilized for the welding of substantially tubular shapes, although the invention has utility in the welding of seams in metal articles of a wide variety of shapes and contours.

In some instances, in the art of electric welding, it is desirable to upset the edges of the plate or plates which are to be welded prior to the welding thereof in order to provide a thickened contacting portion at the seam line. In such case it is desirable to make provision for this thickened portion. The present invention contemplates an apparatus which will effectively give the desired results in this respect.

In any case, whether pre-thickening is resorted to or not, it is usually, if not always, considered essential to apply such pressure in the welding zone as to bring the preheated edges into firm contact, the contact usually being such that a portion of the metal at welding temperature is pushed out of the plane of the parent stock. It is desirable to make provision for the satisfactory disposition of such metal, and the present invention has for its objects the reception and disposition thereof.

With the usual type of welding apparatus the pressure rolls by means of which the upsetting pressure is applied to the metal are slightly spaced at the seam line to afford room therebetween for the free flow of excess metal outwardly to form a bead the extent of which is not controlled. This bead may comprise in part metal which has been oxidized and therefore not desirable for inclusion within the weld, or may include metal which has been heated to a temperature above the thermocritical temperature and thereby subject to grain growth. In any case, the application of pressure is desirable for two reasons. In the first place, it brings together portions of the metal which have been heated to a welding temperature and preferably portions which have a refined grain structure whereby the characteristics of the finished weld are improved. In the second place, it excludes any metal which might not have desirable welding properties. Since in any case it is impossible to apply just sufficient pressure to insure formation of the weld, the pressure is usually in excess of the minimum requirements, and this excess pressure results in the displacement of some of the metal. The present invention provides means by which this excess metal may be definitely controlled. Instead of being permitted to flow merely in an outward direction, as in the case of spaced pressure rollers of the character referred to, it is caused, preferably to have a lateral component of movement away from the actual seam itself.

In some welding processes, it is deemed advisable to provide a slightly thicker joint than the thickness of the parent metal, in order to compensate for any possible defects in the weld itself. It is not advantageous, however, to provide a finished article having a rough appearance at the seam. The present invention has for one of its objects the provision of an apparatus such that a thickened joint may be formed if desired, while taking care of any metal displaced by reason of the welding pressure.

The accompanying drawing is largely diagrammatic, being representative of a part only of a welding apparatus of the induction heating type in which the heating current for heating the metal is induced in the metal itself as a secondary. In this respect the apparatus may be of the general type disclosed in the co-pending application of James L. Adams, Jr., Serial No. 487,194, filed October 8, 1930. Its utility, however, is not limited to any particular type of welding apparatus. In the drawing:

Figure 1 is a partial top plan view of a portion of one form of apparatus constructed in accordance with the present invention;

Figure 2 is a side elevational view of the apparatus shown in Figure 1;

Figure 3 is an end elevational view of the structure shown in Figure 2; and

Figure 4 is an enlarged detail view illustrating more particularly the seam contacting roll.

The portion of the welding apparatus herein illustrated includes a roll housing 2 in which are mounted pressure applying or welding rolls 3 suitably located to apply pressure to the outside of a tubular article 4 being welded. This article is herein illustrated as comprising a pipe travelling in the direction of the arrow 5. During its travel through the welding apparatus, the adjacent edges thereof are brought to a welding temperature in any desired manner. In the case of an induction welding apparatus, part of the heating means will conveniently comprise an inside coil and core assembly 6 hereinafter referred to as an inductor. Mounted on the end of the inductor 6 is a bracket 7 in which bearings are provided for mandrel rolls 8 and 9 respectively. These rolls are herein illustrated as bearing one against the other at their peripheries adjacent the center line of the inductor 6 and as adapted to bear against substantially diametrically disposed portions of the inside surface of the pipe 4.

The mandrel rolls are further illustrated as being so positioned as to be effective substantially in the plane of pressure application of the welding rolls 3, the mandrel rolls and welding rolls thus forming a substantially confined pass for the pipe 4. The peripheral extent of this pass is such that the material in going therethrough will be subjected to considerable pressure. Inasmuch as the adjacent edges 10 and 11 of the material are at a welding temperature, this portion of the metal is free to flow under the pressure applied, and thus insure the bringing together of the edges under such conditions as to insure formation of the desired seam 12.

By reference more particularly to Figure 4 of the drawing, it will be noted that the mandrel roll 9, which is the roll disposed for supporting engagement with the edges 10 and 11 to be welded, comprises spaced supporting portions 14 each shaped to substantially conform to the inner contour of the pipe on opposite sides of the seam 12. At the center of the roll there is provided a recessed portion 15 directly overlying the seam zone 12, enabling the metal to thicken up at the seam. On opposite sides of the recessed seam engaging portion 15 are metal receiving grooves 16 which allow for the extrusion of any excess metal from the seam, without requiring all of the extruded metal to enter the seam itself. The provision for metal flow laterally from the seam zone into metal receiving pockets or recesses constitutes one advantage of the present invention, and more especially where such pockets or recesses are substantially symmetrically positioned on opposite sides of the seam zone so that thickening of the seam may be obtained as desired.

To those skilled in the art, it will also be apparent that a roll of the structure described may effectively cooperate with the seam whether it be formed in the bottom, or on one side, or the top of the pipe. Under different conditions of operation the welding line is angularly offset with respect to that illustrated in the drawing. In such case, however, the position of the mandrel rolls 8 and 9 will be correspondingly varied.

Carried by the bracket 7 is an auxiliary bracket 17 providing bearings for side guide rolls 18 bearing against the inner sides of the pipe and thus tending to eliminate side thrust on the inductor assembly.

The bearing structure afforded by the mandrel rolls in combination with the side guide rolls 18 is such that the mandrel is not only supported laterally and substantially uniformly from the pipe itself in the welding zone of the material, but in such manner that the tendency toward twisting of the inductor mandrel is minimized. Any twisting tendency of the material being welded is likewise minimized inasmuch as the thickened seam zone interfitting with the central recessed portion 15 of the roll 9 serves as an effective guiding means therefor.

While we have herein illustrated the rollers 8 and 9 as being of different diameters and vertically offset one with respect to the other, it will be apparent that they may be of similar diameters in directly super-imposed relationship, and that they may be of such diameters as not to engage one another. In this respect the drawing is illustrative only.

It will further be understood that other changes in the construction, operation and assembly of the parts may be made without departing either from the spirit of our invention or the scope of our broader claims.

We claim:
1. In a method of autogenously welding metallic edges together to form a seam, the steps including advancing the edges in substantially abutting relation for electrical resistance heating, confining the fluid metal adjacent the seam cleft between said edges within a space having a thickness greater than said edges, and confining the fluid metal in the regions slightly removed from the seam cleft within separated spaces of greater thickness than the first-mentioned space.

2. In a method of welding metallic edges together to form a seam, the steps including advancing the edges in substantially abutting relation for heating, confining the fluid metal in regions slightly removed from the seam cleft between said edges within separate spaces on opposite sides of the cleft, said spaces being thicker than said edges, and confining the fluid metal immediately adjacent the cleft within a space thicker than said edges but thinner than said first-mentioned spaces.

3. In an apparatus for welding longitudinally moving metallic edges together to form a seam, a pressure-roll stand including rolls for engaging opposite surfaces of said edges after heating thereof, at least one of said rolls having a face portion for engaging one of said surfaces in a region where it remains solid, a recessed face portion of smaller diameter than the first-mentioned portion, adapted to overlie the seam as it is formed, and a groove between said portions, the depth of the groove being greater than the difference in the radii of said face portions.

4. A pressure roll for forming a welded seam between moving heated metallic edges in substantially abutting relation, comprising face portions for engaging the edges in regions where they remain solid, and a recessed face portion overlying the seam and effective to confine the fluid metal adjacent said edges to form a thickened rib along said seam, said roll having grooves between said recessed portion and said first-mentioned face portions, said grooves being so positioned as to receive and confine excess fluid metal extruded from said edges in the formation of said seam.

STANLEY H. McKEE.
ALBERT R. FINCH.